United States Patent [19]
Reinecke

[11] 4,345,796
[45] Aug. 24, 1982

[54] ANTI-SKID BRAKE CONTROL SYSTEM FOR CONTROLLING THE TWO PAIRS OF DIAGONALLY OPPOSED WHEELS OF A MOTOR VEHICLE

[75] Inventor: Erich Reinecke, Burgdorf, Fed. Rep. of Germany

[73] Assignee: WABCO Fahrzeugbremsen GmbH, Hanover, Fed. Rep. of Germany

[21] Appl. No.: 174,330

[22] Filed: Aug. 1, 1980

[30] Foreign Application Priority Data

Aug. 17, 1979 [DE] Fed. Rep. of Germany ....... 2933336

[51] Int. Cl.³ ............................................. B60T 8/02
[52] U.S. Cl. ..................................... 303/92; 303/111
[58] Field of Search ............. 303/111, 92, 91, 93–110, 303/20, 119, 113, 6 R; 188/181

[56] References Cited

U.S. PATENT DOCUMENTS

| 4,005,911 | 2/1977 | Klatt et al. | 303/111 |
| 4,049,325 | 9/1977 | Reinecke | 303/92 |
| 4,088,376 | 5/1978 | Lindemann et al. | 303/96 |
| 4,093,317 | 6/1978 | Lindemann et al. | 303/111 |

*Primary Examiner*—Douglas C. Butler
*Attorney, Agent, or Firm*—J. B. Sotak

[57] ABSTRACT

A wheel anti-skid brake control system for controlling the braking effort of the four wheels of a motor vehicle. The system includes a speed sensor, an electronic evaluating circuit, a monitoring safety circuit, a switching device and a solenoid regulated valve for each wheel for deactivating the braking effort of a pair of diagonally opposed wheels when a malfunction occurs in an associated electronic evaluating circuit.

8 Claims, 2 Drawing Figures

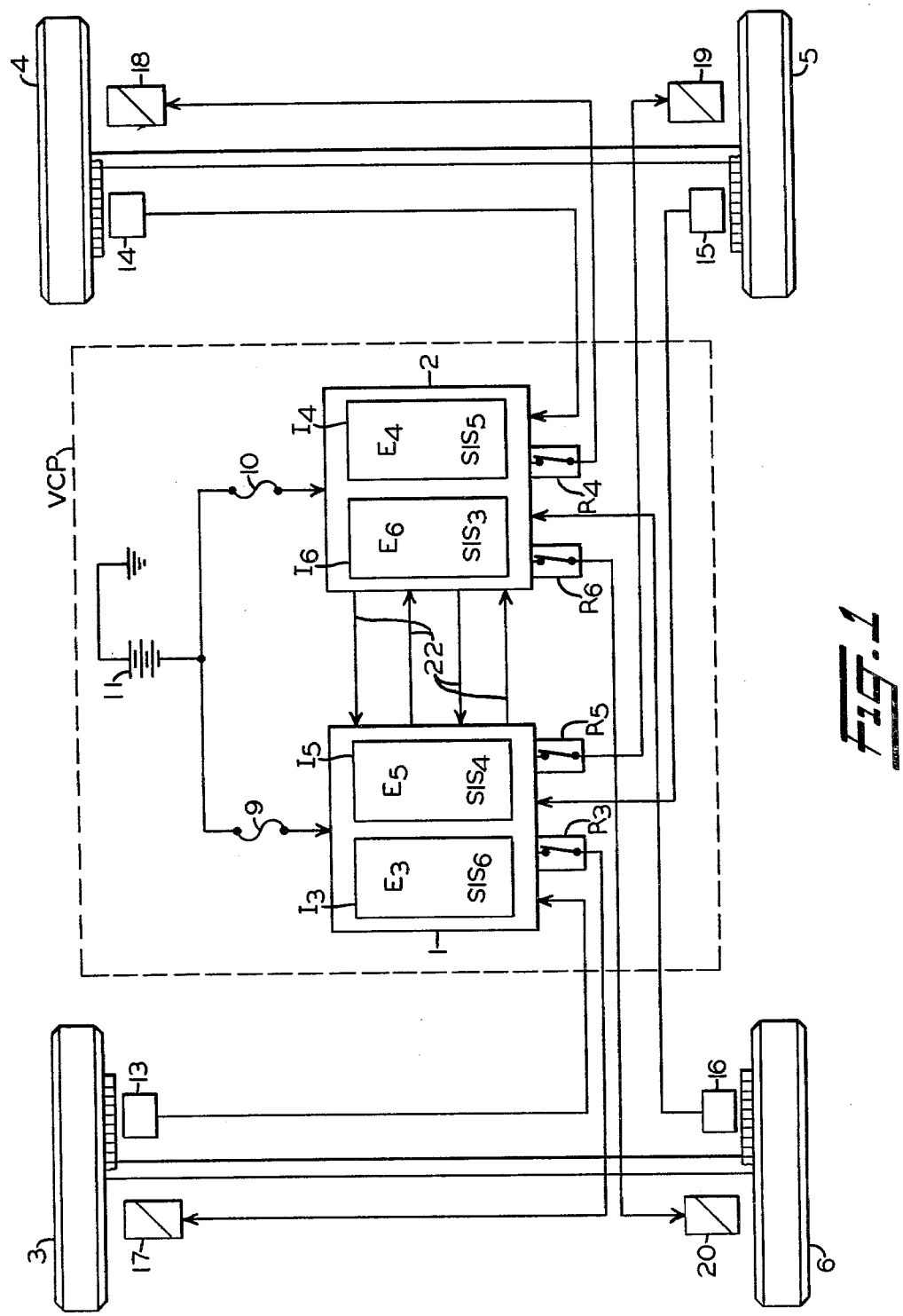

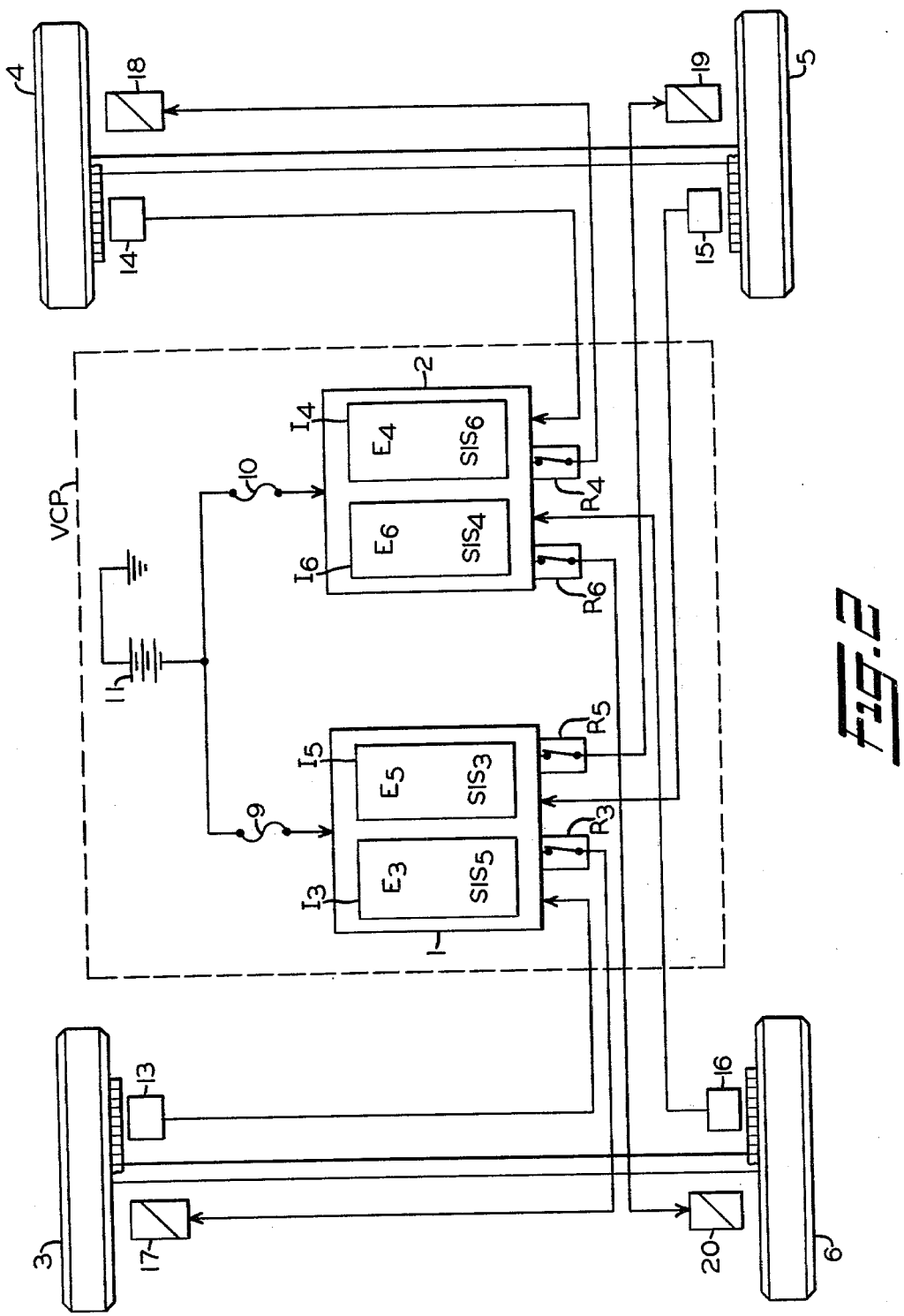

ANTI-SKID BRAKE CONTROL SYSTEM FOR CONTROLLING THE TWO PAIRS OF DIAGONALLY OPPOSED WHEELS OF A MOTOR VEHICLE

FIELD OF THE INVENTION

This invention relates to an anti-skid brake control system for automotive vehicles and, more particularly, to a safety arrangement for a motor vehicle anti-skid braking system in which the dynamic behavior of each wheel is scanned and sensed by individual sensors which feed two separate electronic evaluating circuits that are arranged to control the diagonally opposed wheels so that a circuit malfunction in one of the two electronic evaluating circuits will only deactivate the braking effect of the associated diagonally opposed wheels while maintaining the braking operation on the other diagonally opposed wheels.

BACKGROUND OF THE INVENTION

In the field of wheel anti-skid brake control systems for motor vehicles, the so-called individual wheel control or regulation is considered the most effective, but it is also the most involved and expensive. In the case of individual wheel regulation, the anti-skid brake control system is designed in such a way that a velocity sensor is associated with each vehicular wheel. Thus, the dynamic or rotational behavior of each wheel is separately scanned and is employed to control the magnetic solenoid valve and associated brake cylinder over its own regulating channel. In such anti-skid braking system, each wheel is separately regulated so that optimum slip results, and thus the vehicle exhibits a minimum stopping distance while maintaining its steering capability.

Furthermore, it is common practice to provide a safety switching arrangement in some of the previous anti-skid brake control systems. The safety switch senses and monitors the signals which are supplied by the sensor or those that are used to control the magnetic solenoid valve for being present for an undue period of time. Such an over-extended duration generally means or signifies that the signals are lasting too long. When such an overtime signal period is determined, the regulating portion of the vehicle braking system is turned off or shut down by the safety switch, and thus the system reverts to normal braking operation without any regulation.

Now if the anti-skid system is functioning to provide regulating braking of the vehicle, and the safety switch suddenly turns off the regulation due to the determination of a faulty condition, then the magnetic solenoid valves are placed in their open positions. Thus, the driver of the vehicle assumes the braking operation, and the brake pressure is completely controlled by the foot pedal control valve. In many cases, the driver exerts excessive pressure on the foot pedal so all the wheels of the vehicle are suddenly locked-up. Under this condition, the wheels lose lateral stability with the roadway, and the vehicle can no longer be properly steered since it tends to skid sideways.

Furthermore, in conventional anti-skid brake control systems, there is also a possibility that a malfunction or fault can occur in the safety switch itself. When this happens, the overall security of the anti-skid system may be entirely lost since a simultaneous failure in the regulation apparatus may go unnoticed and undetected.

Additionally, it is well known as shown and described in U.S. Pat. No. 4,088,376 to develop a vehicle reference speed from the velocities of at least two wheels and then to compare them with the actual wheel velocity or ground speed. In practice, at least one non-driven wheel, for example, a front wheel, is utilized to develop the minimum reference velocity since the rear wheels which are very sluggish due to their connection to the transmission and, in turn, the engine, can be easily stabilized and regulated even on a road that has a very low coefficient of friction.

However, a problem can occur when a common vehicle reference velocity is employed to regulate the braking of all of the wheels since an erroneous reference velocity may actually result in the loss of braking on several of the wheels of the vehicle.

OBJECTS AND SUMMARY OF THE INVENTION

Accordingly, it is an object of this invention to provide a new and improved wheel anti-skid brake control system which exhibits a stable regulating behavior even when a very low coefficient of friction exists.

A further object of this invention is to provide a unique anti-skid vehicle braking system which ensures sufficient braking effort while maintaining safe steering during a failure in the system.

Another object of this invention is to provide a novel wheel anti-skid braking system which exerts sufficient braking effect and exhibits stable steerability even during the presence of malfunction in the system.

Yet a further object of this invention is to provide an improved anti-skid braking system which furnishes adequate braking and affords sufficient driving stability even during a failure in the safety switching apparatus.

Yet another object of this invention is to provide a wheel anti-skid brake control system which derives a reference velocity from the two diagonally opposed wheels of the vehicle for regulating the same diagonally opposed wheels.

Still another object of this invention is to provide an anti-skid control system for an automotive vehicle which employs a safety switching arrangement cooperatively associated with the two sets of diagonally opposed wheels so that only one of the sets of diagonally opposed wheels is possibly locked-up when its associated safety switch is turned off while the other set of diagonally opposed wheels continues to be regulated wherein the vehicle remains stable from the standpoint of steering and driving.

Still a further object of this invention is to provide an anti-skid brake control system for a motor vehicle in which a haphazard failure in the regulating apparatus causes sufficient retardation due to the two-channel braking layout.

In accordance with the present invention, there is provided an anti-skid brake control system for an automotive vehicle having at least four wheels. A separate speed sensing unit is associated with each of the four wheels for producing output signals in accordance with the dynamic behavior of the respective wheel. Each speed sensing unit is connected to an associated electronic evaluating circuit which produces control signals in accordance with the output signals. A solenoid regulating valve is provided for each of the four wheels for controlling the braking effort in accordance with the control signals. A switching means is provided for each of the four wheels having a safety circuit disposed in integrated circuit relationship with an unrelated electronic evaluating circuit against a malfunction and having switch elements for deactivating the solenoid regulating valves of a pair of the diagonally opposed wheels of the automotive vehicle when a malfunction occurs in its associated electronic evaluating circuit.

BRIEF DESCRIPTION OF THE DRAWINGS

The above objects and other attendant features and advantages of the present invention will become more readily apparent from the following detailed description when considered and reviewed in conjunction with the accompanying drawings, in which:

FIG. 1 is a schematic diagram of an anti-skid brake control system with mutual monitoring of both electronic units.

FIG. 2 is a schematic block diagram of a wheel anti-skid brake control system with fully separate electronic units.

DETAILED DESCRIPTION OF THE INVENTION

Referring now to the drawings, and in particular to FIG. 1, there is a motor vehicle having at least four wheels 3, 4, 5, and 6. Each of the wheels of the vehicle is provided with an associated speed sensor 13, 14, 15, and 16 and also with an electromagnetic regulating or solenoid control valve 17, 18, 19, and 20. The respective wheel speed sensor produces output signals having a frequency which is proportional to the rotational speed or in accordance with the dynamic behavior of its associated wheel. As shown, the output signals of sensors 13, 14, 15, and 16 are fed to a vehicle carried control package VCP which includes the necessary electronic and electrical apparatus. It will be seen that the sensors 13 and 15 are connected to a first electronic unit 1 while the sensors 14 and 16 are connected to a second electronic unit 2. The first electronic unit 1 effectively controls solenoid valves 17 and 19 for regulating the braking effort on diagonally opposed wheels 3 and 5. In a similar way, the second electronic unit 2 controls the braking effort on wheels 4, 6 of the motor vehicle. It will be appreciated that the various fluid pressure parts of the braking system, such as the reservoir, the foot pedal and the associated piping, as well as the brake cylinders which are controlled by the solenoid control valves 17, 18, 19, and 20 are not shown for purposes of convenience and simplicity.

It will be seen that the electronic units 1 and 2 each contains a pair of safety circuits $SIS_6$, $SIS_4$ and $SIS_3$, $SIS_5$ as well as a pair of electronic evaluating circuits $E_3$, $E_5$ and $E_6$, $E_4$. As shown in FIG. 1, the safety circuits $SIS_6$, $SIS_4$ for the electronic unit 2 are transposed and completely or partially incorporated in unit 1, and correspondingly, the safety circuits $SIS_3$, $SIS_5$ for the electronic unit 1 are transposed and completely or partially incorporated in electronic unit 2. It will be appreciated that the electronic units 1 and 2 are to be arranged as separate integrated circuits $I_3$, $I_5$ and $I_6$, $I_4$, respectively, which are IC modules or chips for safety purposes. Thus, the safety circuitry which monitors certain critical malfunctions, namely, the integrity and accuracy of given control signals, of one pair of diagonally opposed wheels is integrated into the electronic control unit of the other pair of diagonally opposed wheels so that the safety of the overall braking system is ensured.

It will be noted that the power supply of both electronic control units 1 and 2 is provided by a suitable storage battery 11 over two separate fuse elements 9 and 10, respectively. Thus, the safety circuits $SIS_6$, $SIS_4$ in unit 1 receive the signals to be monitored from the electronic devices $E_6$, $E_4$ of unit 2 over lines 22 to switch off the regulation of the electronic unit 2 in case of malfunction by conveying a signal to the coil of an electromagnetic relay for opening contacts $R_6$, $R_4$. In a corresponding manner, the safety switches $SIS_3$, $SIS_5$ monitor the condition of the electronic devices $E_3$, $E_5$ for controlling the relay contacts $R_3$ and $R_4$ via lines 22. In case of a malfunction, a suitable warning light (not shown) is turned on to alert the operator of the vehicle of the impending condition so that he can exercise diversionary action in the situation. However, if the operator fails to act appropriately and continues to overbrake by maintaining too much pressure on the foot pedal, the lock-up of either pair of diagonally opposed wheels minimizes vehicle instability so that the operator may continue to safely steer and guide the vehicle.

In principle, the arrangement shown in FIG. 2 is similar to the one illustrated in FIG. 1, and only differs from the standpoint that the electronic evaluating and safety circuits of both electronic units 1 and 2 are completely independent from each other. That is, the electronic chips 1 and 2 are separate entities which function independent of each other so that there are no more interconnecting signal control lines 22. Thus, the electronic evaluating circuits $E_3$, $E_5$ and the safety circuits $SIS_5$, $SIS_3$ of electronic control unit 1 are formed on separate IC modules or chips. That is, the safety portion $SIS_5$ is arranged on the integrated switching circuit $I_3$ along with the electronic evaluating portion $E_3$, and correspondingly, the safety portion $SIS_3$ is arranged on the integrated switching circuit $I_5$ along with the electronic evaluating portion $E_5$. Similarly, the electronic evaluating circuits $E_6$, $E_4$ and the safety circuits $SIS_4$, $SIS_6$ of the second electronic unit 2 are constructed as individual IC modules or chips. As shown, the safety portion $SIS_4$ is arranged on an integrated switching circuit $I_3$ along with the electronic evaluating portion $E_6$, and conversely, the safety portion $SIS_6$ is arranged on the integrated switching circuit $I_4$ along with the electronic evaluating portion $E_4$. It will be appreciated that a malfunction in evaluating circuits $E_3$ or $E_5$ is transferred to cross-connected safety circuits $SIS_3$ or $SIS_4$ which causes the opening switch contacts $R_3$ and $R_5$ to deenergize the regulating valves 17 and 19 of the diagonally opposed wheels 3 and 5, respectively. Conversely, a malfunction in evaluating circuits $E_6$ or $E_4$ is transferred to the cross-connected safety circuits $SIS_6$ or $SIS_4$ which causes the opening of the switch contacts $R_6$ and $R_4$ to deactivate the regulating valves 20 and 18 of the diagonally opposed wheels 6 and 4, respectively.

It will be appreciated that since the electronic units 1 and 2 are completely independent of each other, namely, the electronics, the safety circuits, the fusing and voltage supply, the conductor plates as well as the speed sensors and the solenoid regulating valves for each of the diagonally opposed wheels, the occurrence of a malfunction in any of the control circuits of the anti-skid brake control system of FIG. 2 cannot lead to an adverse effect in the braking action even if the safety switch itself becomes defective before the occurrence of a malfunction in the electronic device. A failure at any point in the system can only affect the braking action of a set of diagonally opposed wheels. Thus, since the entire electronic system is divided into two individual units each of which is adapted to separately control one pair of diagonally opposed wheels, the overall safety of the system is considerably increased with relatively little effort.

It will be appreciated that various changes and modifications may be made by those skilled in the art without departing from the spirit and scope of the present invention. For example, the electromagnetic switching relays $R_3$, $R_4$, $R_5$, and $R_6$ can be replaced by electronic switching devices, such as, transistors, thyristors or other semiconductive devices which can make or break the circuits to the solenoid brake regulating valves 17, 18, 19, and 20. Therefore, it will be understood that all alterations, ramifications, and equivalents will be readily comprehended by persons skilled in the art, and thus, it is obvious that the invention is not limited to the exact embodiments described herein but is to be accorded the full scope and protection of the appended claims.

Having thus described the invention, what I claim as new and desire to secure by Letters Patent, is:

1. An anti-skid brake control system for a motor vehicle having at least two pairs of diagonally opposed wheels comprising,
   (a) sensing means for producing output signals in accordance with the rotational behavior of each wheel of both pairs of diagonally opposed wheels,
   (b) evaluating means for each wheel of both pairs of diagonally opposed wheels for producing control signals in accordance with the output signals,
   (c) regulating means for each wheel of both pairs of diagonally opposed wheels for controlling the braking effort in accordance with the control signals, and
   (d) switching means for each wheel of both pairs of diagonally opposed wheels for monitoring the evaluating means and for deactivating the regulating means of either of the two pairs of diagonally opposed wheels when a circuit malfunction occurs in their respective evaluating means.

2. The anti-skid brake control system as defined in claim 1, wherein said evaluating means of one of said pair of diagonally opposed wheels is included in one electronic unit and said evaluating means of the other of said pair of diagonally opposed wheels is included in other electronic unit.

3. The anti-skid brake control system as defined in claim 2, wherein each of said switching means includes a a safety circuit and a switch element for interconnecting said evaluating means to said regulating means.

4. The anti-skid brake control system as defined in claim 3, wherein said safety circuits of said one pair of diagonally opposed wheels is included in said another electronic unit and said safety circuits of said other of said pair of diagonally opposed wheels is included in said one electronic unit.

5. The anti-skid brake control system as defined in claim 4, wherein said evaluating means and said safety circuits are integrated circuits.

6. The anti-skid brake control system as defined in claim 3, wherein said switch element is an electromagnetic relay having at least one switching contact.

7. The anti-skid brake control system as defined in claim 3, wherein said safety circuits and said evaluating means are cross-coupled for said one pair of diagonally opposed wheels and said safety circuits and said evaluating means are cross-coupled for said another pair of diagonally opposed wheels.

8. The anti-skid brake control system as defined in claim 2, wherein a first fuse is interconnected between a source of voltage and said evaluating, switching, and regulating means of said one of said pair of diagonally opposed wheels and a second fuse is interconnected between the source of voltage and said evaluating, switching, and regulating means of said other of diagonally opposed wheels.

* * * * *

UNITED STATES PATENT AND TRADEMARK OFFICE
CERTIFICATE OF CORRECTION

PATENT NO. : 4,345,796
DATED : August 24, 1982
INVENTOR(S) : Erich Reinecke

It is certified that error appears in the above-identified patent and that said Letters Patent are hereby corrected as shown below:

Column 6, line 8, delete "other" and insert --another-- line 11, delete "a", first occurrence

Signed and Sealed this

Twenty-fourth Day of May 1983

[SEAL]

Attest:

DONALD J. QUIGG

Attesting Officer

Acting Commissioner of Patents and Trademarks